Oct. 5, 1954  W. F. ZIMMERMANN ET AL  2,690,701
CUTTER RESETTING MEANS FOR HOBBING MACHINES
Filed March 10, 1950  3 Sheets-Sheet 1
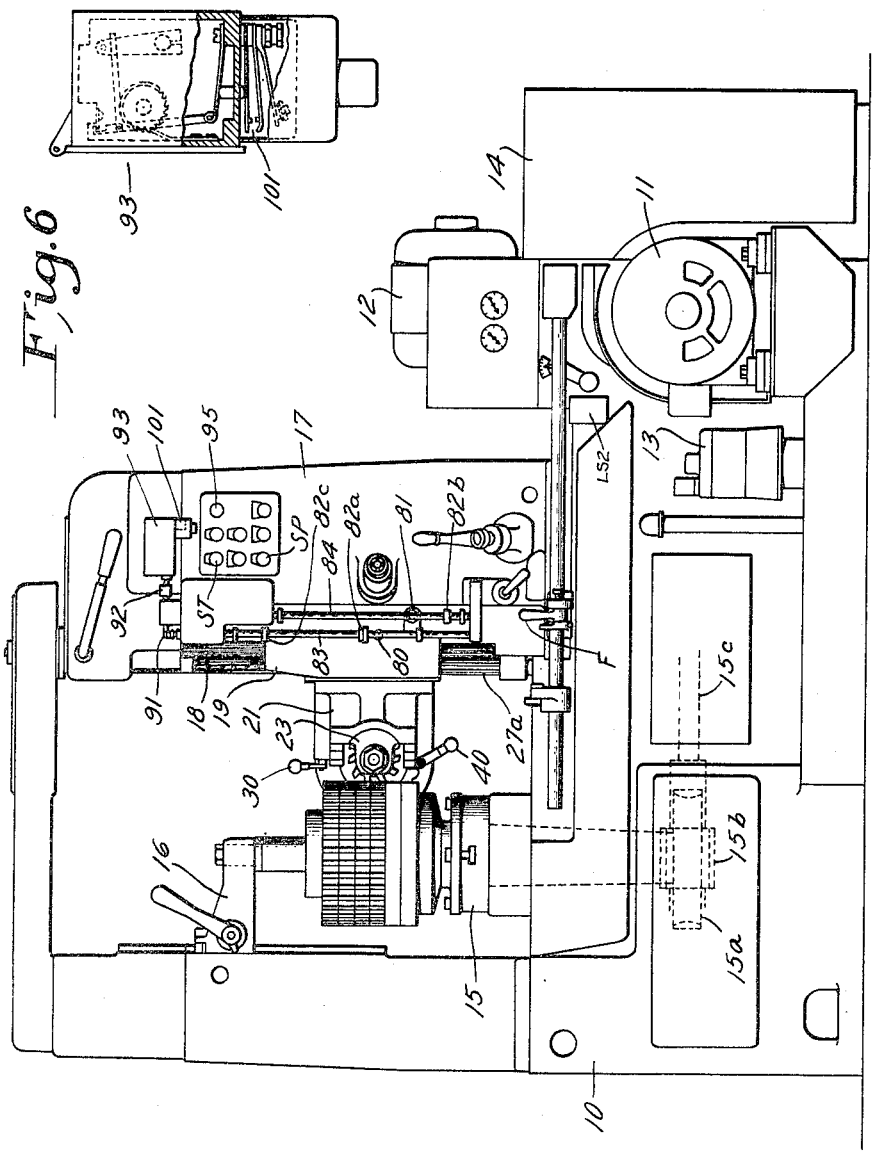
INVENTORS.
William F. Zimmermann
Granger Davenport
BY
Harold F. Scribner
ATTORNEY

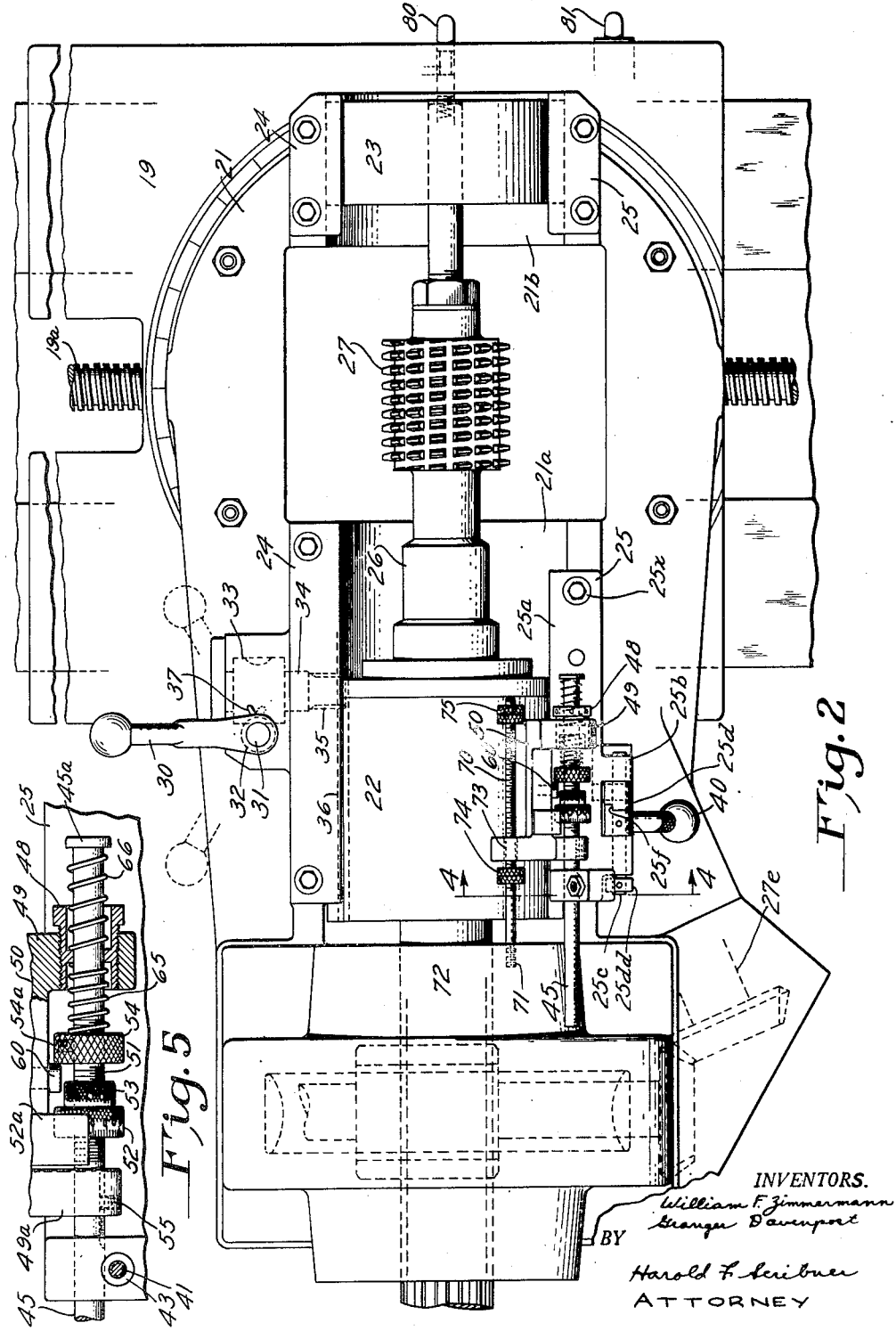

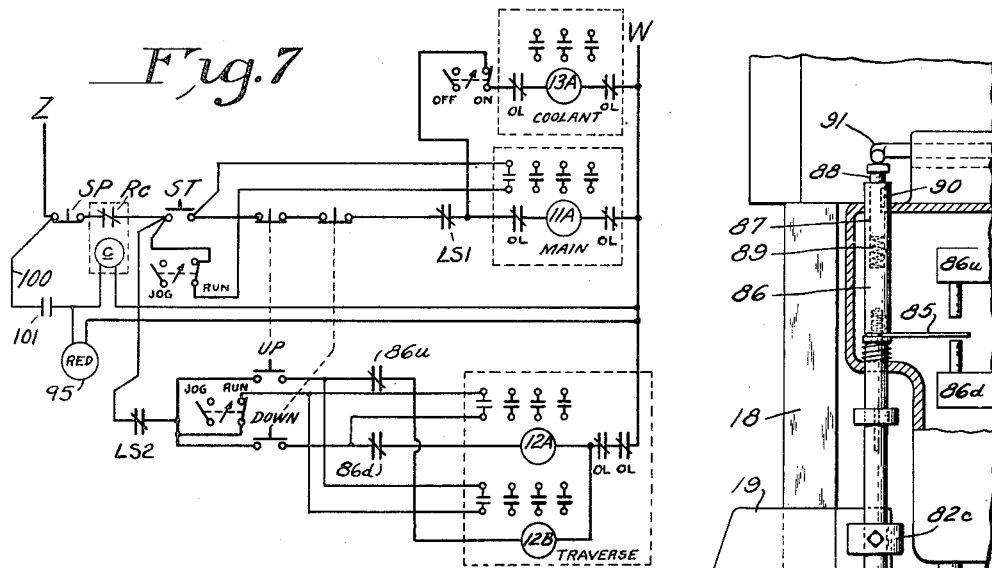
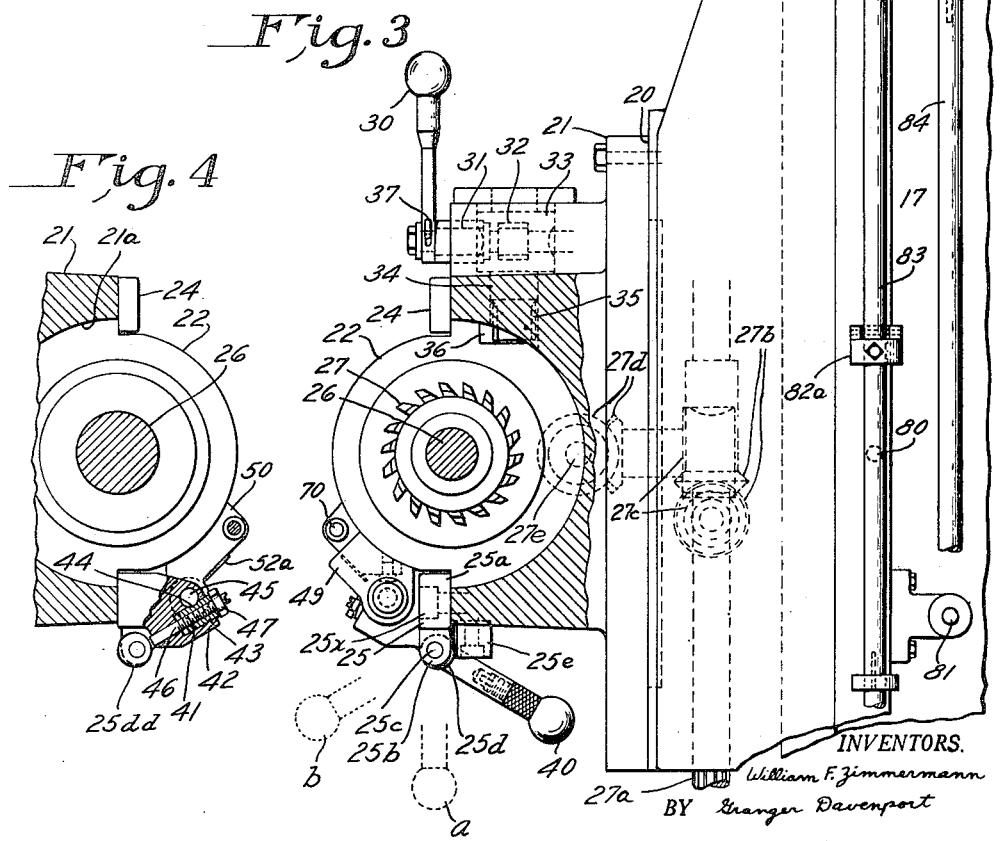

Patented Oct. 5, 1954

2,690,701

UNITED STATES PATENT OFFICE 2,690,701

CUTTER RESETTING MEANS FOR HOBBING MACHINES

William F. Zimmermann, Maplewood, and Granger Davenport, Montclair, N. J., assignors to Gould & Eberhardt, Incorporated, Irvington, N. J., a corporation of New Jersey Application March 10, 1950, Serial No. 148,866

15 Claims. (Cl. 90—4)

The present invention has to do with improvements in gear-hobbing machines and is concerned more particularly with a method and means of obtaining maximum production with a given hobbing cutter by prolonging the usable life of the hob before resharpening becomes necessary.

The art of hobbing teeth in a gear blank utilizes a generating principle in which the cutter is shaped much like a worm thread and is caused to rotate and simultaneously travel across the face of the blank while the latter is rotating in timed relation about an axis transverse the hob axis. When the blank has made one complete revolution, a portion of all of the teeth will have been formed. Succeeding revolutions of the blank bring new linear portions to the cutter and eventually the cutter will have traveled across the entire face of the blank and complete teeth will have been formed around the blank and linearly thereof the required face width.

As the machine industry developed, a need arose for increased production and for still greater accuracy in gear tooth contour. To meet such demands it has been proposed to utilize higher speeds and periodically to shift the hob cutter tangentially of the blank between work setups, so as to bring one or more new cutting teeth of the hob into cutting relation with the blank or stack of blanks to be cut.

The extent of tangential shift of the hob is, of course, limited, and should not be so great that the teeth to be cut run off either end of the hob. However, a limited shifting between cutting operations is permissible without impairing tooth shape and the life of a given hob is greatly extended if the initial positioning and subsequent shifting of the hob are properly achieved.

The present invention is more especially concerned with an improved semiautomatic mechanism whereby the hob may be shifted axially of itself a succession of times and each time a preselected unit distance precalculated in accordance with the pitch of the gear and hob; for such cases, therefore, initial positioning and subsequent shifting must be effected with due regard to the distances between shifts. In cutting large numbers of teeth on a gear it has been customary to set the hob more or less by eye without serious consequences. However, in cutting gears with relatively few teeth, such as a pinion gear, minute flats are produced and the hob should be precision-located either on a tooth or tooth space that falls on a common line joining the axis of the blank and the hob in order to balance the flats.

To insure accuracy in hob settings this invention proposes a structure that will enable the operator, after correctly centralizing the hob either on a tooth or space, and after determining the increment of axial shift required, to effect hob shifting and hob resettings expeditiously and efficiently without further calculating or use of indicator instruments. By way of further refinement the invention proposes a structure operative with equal facility, in any position, within the range of 180 degree tilt of the hob-spindle carriage in conjunction with correlated mechanism constructed and arranged to indicate when the hob should be reset and the maximum number of resettings that may be effected within the range of a given hob.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Fig. 1 of the drawings is a side elevation of a representative hobbing machine embodying the invention.

Fig. 2 is an enlarged view of the hob slide, as viewed from a position normally occupied by a gear blank.

Fig. 3 is a side view of the slide, shown partly in section better to illustrate features of the invention and correlated parts.

Fig. 4 is a sectional view taken along the line 4—4 of Fig. 2.

Fig. 5 is an enlarged view of portions of the cutter-resetting mechanism.

Fig. 6 is an enlarged view of portions of the mechanism that may be embodied automatically to register the number of hob shifts for a given setup and to block further machine operations at the end of a predetermined number of shifts.

Fig. 7 is an electric wiring diagram on the control circuit.

Hobbing machine in general

Referring more particularly to Fig. 1 of the drawings the hobbing machine illustrated comprises essentially a main base 10, on and in which the main driving trains are supported, all deriving power from motors 11, 12, and 13, and from change-gear transmissions located within an enclosure 14. In the interests of clarity, a detailed description of the various elements of different drive trains will be omitted as being unnecessary to a clear understanding of the instant invention.

The base 10 also journals a rotatable work table 15 upon which one or a stack of gear blanks to be cut is mounted and clamped. A vertically adjustable outboard support 16 is provided for centering and steadying the upper end of the stack of blanks. The work table extends well into the base 10 and carries a worm gear 15a that is driven by a worm 15b mounted upon a driven shaft 15c.

Medially of the work table 15 and the gear box 14, a cutter stanchion 17 is mounted, upon guides provided by the base, for adjustment toward and away from the table in a manner familiar in the art.

At the work-table side of the stanchion 17 guide ways 18 are provided upon which a hob slide 19 is mounted for vertical movement by means of a rotatable feed screw 19a and nut (not shown). The front of the hob slide 19 is formed with a finished pad 20 upon which a hob swivel head 21 is pivotally supported. The head 21 is pivoted centrally of the slide and in the instant embodiment may be given an angular movement through 180° and clamped in any desired position.

As illustrated more clearly in Figs. 1, 2, and 3 the hob swivel head 21 is provided with two semicircular cradles 21a and 21b which are adapted to receive complementary formed hob-spindle bearings 22 and 23, each of the latter being normally held in place by overlaying guide and clamp straps 24 and 25 respectively. A hob spindle 26, or a hob arbor, as the case may be, is journaled within the bearings 22 and 23 and is adapted to carry, intermediate its ends, a hobbing cutter 27.

The hob spindle is driven by the main motor 11 through gearing arranged in the enclosure 14, splined shafting including a vertical shaft 27a, and gear sets 27b, 27c and 27d. Gear set 27c comprises a worm and a gear and is centered in the hob slide 19. The gear of the set 27c drives a bevel-gear set 27d. Gear set 27d drives a shaft 27e journaled in the hob swivel head, which transmits power to the hob spindle through additional gears (illustrated in dotted lines) carried in the hob swivel head. Through the mechanisms, thus briefly described, the work table 15, hob slide 19, and the hob 27 may be power actuated at coordinated rates determined by the gear selection in the enclosure 14, as will be understood by one familiar with hobbers in use today.

A typical hobbing action may be likened to that of a revolving worm traversing across the face of a gear of a constant pitch, the gear slowly revolving about its axis, while the worm is also revolving and simultaneously moving in a direction parallel to the axis of the gear. If the worm is longitudinally gashed about its periphery and the leading faces of the remaining thread portions sharpened and otherwise shaped and relieved to provide cutting teeth, a hobbing cutter is formed and a solid blank may be placed in the path of feed of the cutter and its periphery cut out to form gear teeth. If the hob teeth be regarded as successive portions of a straight-sided rack, their cutting action on a revolving blank is such as to generate an involute curve on the sides of the teeth being formed. Assuming the gear to be relatively large in diameter, and relatively fine pitch, the hob may be set, relative to the axis of the blank, by eye, and continuous involute tooth forms will be generated in the blank. However, if the blank to be cut is small in diameter and is to have relatively few teeth, and or if the hob has relatively few flutes therein, the sides of the teeth being cut will contain a succession of flats instead of a continuous curve. For most small pinion gears, the flats are not objectionable provided they are equally balanced on both sides of the teeth. Balancing of the flats is also an important factor in subsequent gear-shaving operations, i. e., so that a minimum of equal amounts of metal need be removed from each of the sides of the teeth.

The location of the flats on the sides of a tooth may be equalized if the hob cutter is centralized on a tooth or space with the axis of the gear, and hob-setting gauges have long been used for that purpose. However, as related to the present invention, centralizing on a tooth or space becomes essential also for the purpose of establishing a reference point from which the increments of axial shift of the hob to the right or to the left from the established zero position can be based. In the absence of centralization a hob may generate unequal flats on the teeth in its initial position, rendering subsequent finishing operations difficult, and may generate similar unequal flats in all reset positions thereof.

With the aid of the present invention an exceedingly simple device is made available whereby the operator, after centralizing the hob, may conveniently and expeditiously effect repeated resettings of the hob and by so doing distribute the normal wear over a greater number of cutting teeth. Figs. 2 to 5 illustrate a preferred structure for effecting manual shifting of the hob in definite increments. As hereinabove mentioned the hob spindle is journaled in main bearing 22 and outer bearing 23 which normally are clamped in the hob-swivel-head cradles 21a and 21b by straps 24 and 25. When the straps of the main bearing 22 are unclamped, the hob spindle with its hob cutter may be shifted bodily axially several inches in either direction. During the shifting the outer end of the spindle is arrange to slide axially within the bearing 23. Shifting of the spindle and bearings is accomplished in accordance with this invention by manually actuating a ratchet handle 30 clockwise or counterclockwise. The ratchet handle 30 is positioned to one side of the axis of the spindle and is operatively secured to one end of a worm shaft 31 journaled in the hob swivel head 21. The inner end of the shaft carries a worm 32 that meshes with a worm gear 33 on a stub shaft 34 also journaled in the hob swivel head. The shaft 34 has gear teeth 35 cut therein which mesh with the teeth of a rack 36 that is secured to the main spindle bearing 22. A direction-selector pin 37 carried by the ratchet handle 30 is provided to select the direction in which oscillation of the handle will shift the hob, spindle, and bearing.

To effect secure clamping of the hob main bearing 22 in the desired positon, one of the clamping straps 25 for the main-bearing 22 is constructed as a lever having its fulcrum located intermediate its ends. In the embodiment illustrated, the main bearing strap 25 is made long enough to span the length of the main bearing plus the amount that the bearing may be shifted from one extreme to the other, and is held in operative position on the bearing cradle portion by means of cap screws 25x which serve as fulcrum points; see Fig. 3. A portion 25a of the main-bearing strap 25 overlays a ledge formed in the bearing, and a portion 25b thereof, positioned at the opposite side of the fulcrum, journals a cam shaft 25c. The cam shaft 25c carries two spaced eccentrics or cams 25d and 25dd. Cam 25d is constructed to bear against a relatively fixed backing plate 25e secured to the hob swivel head, and cam 25dd is arranged to actuate a gage-rod clamp pin 41 later to be described. The shaft 25c also has pinned thereto a handle 40 that is interlocked with the cam 25d by a stepped joint 25f and by means of which the cam may be rotated to clamp or unclamp bearing 22. When the handle 40 is in the full-line position illustrated in Fig. 3, the cam shaft is in a position such that the high portion of the cam 25b bears against the abutment 25e and the outward thrust thereof rocks the strap 25 about its fulcrum 25x to bring the portions 25a into clamping engagement with the main bearing 22. When the handle 40 is actuated to either of positions a or b, indicated by dotted lines in Fig. 3, the cam 25d is revolved away from the abutment 25e and the spindle bearing is unclamped and ready for shifting.

The cam 25dd is adapted on rotation to engage and operate gage-rod clamp pin 41, illustrated more clearly in Fig. 4. The pin 41 is journaled for axial movement in a portion 42 of the main-bearing strap 25, and is surrounded by a relatively adjustable clamp sleeve 43. The sleeve is provided with a cutaway portion 44 in its periphery which partially surrounds an endwise shiftable gage shaft 45. The angular position of the cams 25d and 25dd, with relation to the backing abutment 25e and to the pin 41 is such that when the lever 40 is in the full-line position of Fig. 3, the cam 25d bears against abutment 25e, and the cam 25dd is out of engagement with pin 41 and when the lever 40 is actuated forward to its other extreme position b, the cam 25d is released from its abutment and the cam 25dd engages and shifts the clamp pin 41 outwardly. Outward movement of the pin 41, carrying the sleeve 43 and its recess 44 therein, clamps the shift rod 45. When lever 40 is in a midposition a (Fig. 3) both shift rod 45 and main bearing 22 are unclamped. Adjustment for wear on the recess 44 of the sleeve 43 is effected by screw threads 46 provided between the sleeve and the pin 41. A lock nut 47 threaded to the exposed end of the pin 41 serves to restrain the pin 41 from moving relative to the sleeve 43 when its effective length has been properly adjusted.

The gage rod 45 extends through the projection 42 and is guided at one end in a bushing 48 that is screw-threaded into a portion 49 of a bracket 50. The bracket 50 is firmly secured by suitable screws to the exterior of the main bearing 22. The gage rod 45 is also threaded intermediate its ends, as at 51, to receive adjustable abutment collars 52, 53, and 54. The rod 45 extends through another portion 49a of the bracket 50 wherein a key 55 operating in a keyway provided in the rod, keeps the latter from turning while permitting axial shifting.

As illustrated in Figs. 2 and 5, the threaded collars 52 and 53 are together and located on the left side of a stop pin 60 fixedly embedded in the bracket 50, and the third collar 54 is located on the right side of the stop pin. The collars 52 and 53 serve as jam nuts for each other, both being radially drilled for wrench stems, whereas the collar 54 is constructed to be clamped in adjusted position by a set screw 54a bearing against the rod threads through a brass plug. Collar 52 is exteriorly graduated into 50 divisions, which, in combination with a 20-pitch thread, will equal .001" axial movement per division of angular adjustment.

As illustrated in Fig. 5, the collars 52 and 54 are larger than the collar 53 and have their outer rims positioned to abut the projecting end of the stop pin 60, whereas collar 53 is somewhat smaller and the pin may move past the periphery thereof. In the position illustrated in Figs. 2 and 5, collar 54 is abutting the pin 60 and the rod 45 is unclamped in the bearing portion 42 of the strap 25. This position of the rod is maintained normally by means of one of a pair of oppositely acting compression springs 65 and 66 surrounding the rod 45. One of the springs 65 is arranged to react between the face of collar 54 and its seat in the adjustable nut 48, and the other spring 66 arranged to react between the nut 48 and a headed end 45a of the gage rod 45. Nut 48 is exteriorly threaded into a recess formed in the bracket 50 and by adjusting the nut in or out in the bracket one or the other of the springs may be placed under the greater compression and tend to bias the gage rod to the right or to the left. In the position illustrated, spring 65 is placed under compression and tends to move the shift rod 45 toward the left and the collar 54 up against the stop pin 60. When the handle 40 is actuated to position b, the main bearing 22 is unclamped from its cradle in the swivel head 21, and the gage rod is clamped to the swivel head at 44. With the parts so related, the ratchet handle 30 may be actuated to effect lateral shift of the main bearing, arbor, and hob a distance equally the gap existing between the stop pin 60 and the micrometer collar 52. This distance may be but a few thousandths of an inch, in the event it is desired to shift the hob axially a fraction of a convolution represented by one cutting tooth, or it may be as much as the distance between convolutions or one axial pitch. In all cases, the axial shift of the hob will be that required to bring one or more cutting teeth into the cutting zone and the removal therefrom of a corresponding number of worn or dulled cutting teeth.

When the stop pin 60, which is carried by the main bearing 22 engages the micrometer collar 52, further ratcheting of the bearing, arbor and hob is prevented and the operator made aware that the shift has been completed, whereupon he will again actuate the clamp lever 40 from position b (bearing unclamped) to the full-line position of Fig. 3 wherein the bearing and hob are again clamped. Coincidentally, the preloaded spring 65 effects a shifting of the gage rod toward the left, thus bringing stop collar 54 against the pin 60, and moving micrometer collar 52 a fixed predetermined distance away from the pin in readiness for the next hob-shifting operation.

In the event that the hob is to be shifted to the right, i. e., opposite from the direction described, the threaded collar 48 is unscrewed from the bracket 50 so as to place spring 66 under the greater compression. Under such conditions, the micrometer collar 52 will be against the stop pin and a fixed predetermined gap exists between the stop pin and the collar 54. When the main bearing is unclamped from its cradle, the shift rod 45 is clamped, and the ratchet handle 30 actuated in the opposite direction to effect shifting of the hob to the right. During the shifting, the pin 60 will traverse the gap and be stopped against the collar 54. When the main bearing is again clamped, shift rod 45 is released and the preloaded spring 66, acting between the nut 48 and the headed end 45a of the rod, will shift the rod to the right and automatically reposition the parts in readiness for the next shifting operation.

To guard against inadvertent over shifting of the hob in either direction, means have been provided to limit the extent of available movement for a given hob. A preferred device for this purpose is illustrated in Fig. 2, and comprises a threaded shaft 70, one end 71 of which is threaded tightly in a portion 72 of the gear housing of the head 21, and the free end of the shaft extends through an opening 73 provided in the bracket 50. The shaft 70 carries, at opposite sides of the bracket 50, pairs of knurled jam nuts 74 and 75 adapted to be locked on the shaft 70 at the required distance for a selected hob and number of shifts permissible. In the position of the knurled nuts and bracket 50, shown in Fig. 3, the hob has been shifted toward the left to almost its extreme position. A slight farther shift would bring the bearing bracket 50 against the knurled collars 74 and additional movement in that direction positively stopped.

From the foregoing it will be seen that an exceedingly effective device is provided for effecting a repeated number of hob-resetting operations, each a predetermined accurate increment, determined by the setting of graduated collar 52 in relation to the edge of a zero plate 52a. Actuation of the lever 40 clamps and unclamps the shiftable main bearing 22 and the gage rod 45 automatically and in alternation, and requiring only the actuation of ratchet handle 30 to effect the actual shifting of the hob. The act of again clamping the main bearing, automatically releases the gage rod 45 and one of the springs 65 or 66 resets the rod for a succeeding shift increment.

It will be understood that the aforementioned hob-resetting operations, are not effected during the cutting of a gear or a stack of gears, but are effected preferably between cutting operations on different blanks or different stacks of gears. In the machine illustrated in Fig. 1 of the drawings, the hob slide 19 is caused to feed slowly downward but once during the cutting of a single gear or stack of gears mounted on the work table 15. When the hob has been fed completely across the face of the gears, the machine is stopped, the cut gears removed, the hob traversed upwardly to the height required, and a new stack of blanks mounted upon the work spindle. In the conventional machine the feed and traverse cycles of movement of the hob are controlled automatically by trip rods, adjustable tripping dogs, limit switches, and the like, and for an understanding of the instant invention a detailed description thereof is deemed unnecessary. However, as an additional refinement of the present invention, it is proposed to utilize the vertical movements of the hob slide in conjunction with a counting mechanism to give a signal to the operator when it becomes time to reset the hob. On production work, especially, a signal device insures continued efficient gear-cutting performance throughout the available cutting life of a given hob.

Experience has shown that a hob can be relied upon to cut only a certain number of gears before dulling, and by using the vertical movements of the slide as a counting medium and therewith control machine movements and impart a signal, a method of control is readily attained. In the instant embodiment, the hob slide carries yieldable trip pins 80, 81 positioned to engage adjustable stop collars 82 a, b, c mounted upon vertically moveable trip rods 83, 84. The rod 83 is mounted upon the side of the stanchion and carries a laterally extending leaf spring 85, whose free end is positioned to actuate limit switches 86u and 86d. Switches 86u and d are connected in a circuit utilized to control the reversing starter for the slide traverse motor 12.

In normal operation, the slide is started on its downward travel at a traverse rate by operation of the "Down" switch in the control circuit of traverse motor 12. Down travel of the slide continues until pin 80 engages dog 82a and actuates trip rod 83 downwardly. Downward movement of the rod, operating through leaf spring 85, actuates limit switch 86u to its open position and the control circuit of motor 12 is opened and down traverse stops. Thereafter, the operator presses starter button ST in the control circuit of the main motor 11, engages a feed clutch (not shown) by means of a lever F (Fig. 1) and the slide moves downward at a feed rate. After the hob has been fed across the face of the gear or stack of gears, trip pin 81 engages trip dog 82b on the rod 84 and the latter is actuated to open limit switch LS1 in the control circuit of motor 11 and power down-feed stops. At this time the cut gears are removed from the work spindle after which up travel of the slide is instituted by actuating the "Up" switch in the control circuit of traverse motor 12. During the up travel of the slide, trip pin 80 rides past the dog 82a, which is one-way acting, and later engages adjustable dog 82c and lifts the rod 83.

The trip rod 83 also carries an extension 86 recessed at its upper end as at 87 to receive a spring-tensioned plunger 88. A spring 89 reacts between the plunger and the bottom of the recess and tends normally to maintain the plunger extended. A pin-and-slot connection 90 is provided between the plunger 88 and the extension 86 so that the plunger may yield, or the extension overtake the plunger, a limited amount. The upper end of the plunger 88 abuts against a bent lever 91 and will rock same about its axis on an upward movement of the trip rod 83. The lever 91 is coupled as at 92 to a commercial counter (Veeder-Root) indicated at 93, which is arranged to register one digit on each rocking of the lever 91. The yield provided between the plunger 88 and the extension 86 is for the purpose of insuring actuation of the counting device on an upward movement of the hob slide 19, before the leaf spring 85 actuates and opens switch 86u and stops further upward traverse. By this arrangement, the plunger 88 may complete the rocking of lever 91 and be stopped, and the lost motion or yield connection provided allows the extension 86 to continue in motion until the motor control switch has been actuated.

When a predetermined number of blanks has been cut, as indicated by the number of slide cycles registered, the counter having been previously set to that number, the counter operates to open all motor circuits and prevents normal restarting of the machine until the counter has been reset to zero. While the motor circuits are open a red light indicator 95 positioned adjacent the control panel, lights up as a reminder that it is time to shift the hob.

In the control circuit represented in Fig. 7, the motor-starting-switch coils are indicated at 11A, 12A, 12B, and 13A connected across control circuit lines Z and W. Start-and-stop switches ST and SP control the main-motor starter-switch coil, and a portion of the control circuit of the starter switch for the coolant-motor coil 13A. The control circuit for the traverse motor 12 is taken off one of the terminals of the start switch ST and divided into two control circuits, push-button controlled as well as limit-switch controlled, for the up and down traverse movements. Suitable interlocks are incorporated to guard against incompatible or conflicting movements of the feed and traverse motors which, in the instant embodiment include a normally closed limit switch LS2 in the control circuit of the traverse motor starters, and two normally closed button switches in the control circuit of the main-motor starter, the latter two switches being mechanically connected with the "Up" and "Down" switches in the traverse-motor control circuit. Limit switch LS2 is mounted on the main base 10 (Fig. 1) in cooperative relation with the feed-control mechanism indicated at F, and prevents operation of the traverse motor when the feed is engaged. The mechanically connected button switches in the control circuit of the main motor starter, are closed when the traverse motor is inactive, and one or the other is opened automatically when the Up-Down traverse switch is actuated to a closed position. Hence, it becomes impossible to continue operation of the feed motor 11 when either traverse-motor button is pressed.

The signal circuit of this invention includes a line 100 connected with power line Z, counter contact switch 101, red light 95, in series, and connected to power line W. Additionally a relay coil c is connected in parallel with the red light, adapted when energized, to open relay switch Rc connected in series with the main stop switch SP. When the machine is in operation, each upward movement of the hob slide actuates the counter to register one cycle. After a selected number of cycles and counter registerings thereof, the counter switch 101 built into the end of the counter, Fig. 6, is caused automatically to close. Closing of the counter switch 101, energizes the signal light 95 and coil c and the latter effects opening of the switch Rc in the main control circuit. When the switch Rc opens, the circuits to all motor starter coils are opened and the machine stops. To start the machine in operation it is necessary first to reset the counter mechanism 93 back to zero. As this is a manually performed operation, the attention of the operator is at once directed to the fact that the hob has performed the number of cutting cycles desired and it is time to shift the hob laterally to bring one or more sharp teeth into action. After shifting the hob the increment selected, machine operations are resumed and controlled as before and until the requisite number of cycles have again accumulated on the counter.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:

Having thus revealed this invention, we claim as new and desire to secure the following combinations and elements, or equivalents thereof, by Letters Patent of the United States:

1. In a gear-hobbing machine, the combination of a rotatable spindle adapted to carry a hob, means mounting the spindle for movement axially comprising a shiftable spindle bearing, a bearing carrier and means mounted on the carrier adapted when actuated to shift the spindle bearing axially, means for clamping said spindle bearing in a selected shifted position to said carrier, means operatively associated with said carrier and said spindle bearing for limiting the increment of axial movement of the bearing relative to the carrier to a preselected unit distance, said means comprising a gage rod, an abutment member, and a stop collar on said gage rod, means for clamping said gage rods in operative position whereat the increment of bearing shift is determined by the gap between the said collar and said abutment member, and a single means for actuating said last-mentioned clamp means and said bearing clamp means in alternation whereby but one of said clamp means is effective at any one time.

2. The combination of claim 1 which said bearing carrier is angularly adjustable about an axis substantially normal to the axis of the hob-spindle-bearing means and in which said bearing shifting means and said bearing clamping means is operable as set forth in any position of angular adjustment of said carrier.

3. In a gear-hobbing machine, the combination of a shiftable hob spindle adapted to carry a hob, shiftable spindle-bearing means therefor, a support for said bearing means, manually operable means for shifting said bearing means relative to said support, bearing clamping means, means operatively associated with said support and with said spindle-bearing means for limiting the increment of shift of the bearing relative to the support, said means comprising an abutment member carried by said bearing, a shiftable but normally stationary abutment member carried by said bearing support, means for clamping said last-named abutment member a spaced distance from said bearing-carried abutment whereat the increment of bearing shift is determined by the gap between the said two abutment members, manually operable means for actuating said last-mentioned clamp means and said bearing-clamp means in alternation whereby but one of said clamp means is effective at any one time, and means operative on said support-carried abutment to shift said support-carried abutment relative to said bearing-carried abutment said spaced distance from the said bearing-carried abutment when said bearing is in clamped condition.

4. In a gear-hobbing machine, the combination of a rotatable and axially shiftable spindle adapted to carry a hob, a shiftable bearing for mounting the spindle, a support for said shiftable bearing, means mounted on the support adapted when actuated to shift the said bearing axially, means for clamping said bearing in a selected shifted position to said support, manually adjustable means for limiting the increment of axial shift of the said bearing relative to the support said means comprising a gage shaft mounted to the support for movement relative thereto, an adjustable stop collar on said gage shaft, and an abutment member carried by said shiftable bearing, means for clamping said gage shaft to the support in operative position whereat the increment of bearing shift is regulated by the gap existing between the said stop collar and said abutment member, a single means for actuating said gage-shaft clamping means and said bearing-clamp means in alternation whereby but one of said clamp means is effective at any one time, and means operative when said bearing is clamped and said gage shaft is unclamped to shift said gage shaft and said collar relative to said bearing carried abutment member a unit distance in preparation for a succeeding unclamping and shifting movement of the said bearing.

5. In a gear-hobbing machine, the combination of a hob carrier, a shiftable hob-spindle bearing member supported by the carrier, means including a shaft element journaled in the carrier adapted when actuated to shift the said bearing member relative to the carrier, bearing-clamp means for clamping the bearing to the carrier in shifted position, means controlling the increment of shift of said bearing member relative to the carrier upon actuation of said shaft element when said bearing clamp is released comprising a gaging member mounted to said carrier for movement relative thereto, a pair of stops carried by said gaging member, an abutment element carried by said shiftable bearing member in cooperative relation between the stops on said gaging member, means for clamping said gaging member to the carrier with one of the stops thereof in a predetermined spatial relation to said abutment element, means interlocking said bearing clamping means with said gaging-member clamping means so that the gaging member is unclamped when the bearing member is clamped and the bearing member unclamped when the gaging member is clamped, and means to move said gaging member relative to the abutment on said bearing member a distance equal to the gap between the said abutment element and one of the stops on the gaging member when the gaging member is unclamped.

6. In a hobbing machine, the combination of a hob carrier, bearing means in the carrier for rotatively supporting a hob spindle, means operative to shift said bearing means relative to the carrier in a direction axially of the hub spindle including a manually operable shaft journaled in the carrier and power transmitting connections between said shaft and said bearing means, bearing-clamp means adapted to clamp said bearing means in a selected shifted position to said carrier, manually adjustable means for predetermining the unit of shift imparted to said bearing on actuation of said manually operable shaft, said last-named means including a shiftable gage rod, means to shift said gage rod axially, means provided in part by said gage rod and in part by said bearing means for limiting the extent of shift of the gage rod, means operative to clamp said gage rod in a shifted position, and means constructed to actuate said last-named clamp means and said bearing-clamp means in alternating order such that said bearing means is clamped to the carrier when said shiftable member is unclamped and said shiftable gage rod is clamped when said bearing means is unclamped.

7. Means for positively controlling the increment of axial shift of the hobbing cutter of a hobbing machine having a normally fixed but shiftable hob carrier, a support for the carrier, clamp means operative normally to clamp the carrier to said support, means for limiting the extent of shift of the carrier relative to the support comprising a normally fixed but shiftable abutment member carried by said support, clamp means for said abutment member, a second abutment member carried by said shiftable carrier in operative relation to said support-carried abutment member, means to shift said support-carried abutment relative to said carrier-carried abutment when the carrier is clamped to the support, means to shift said carrier-carried abutment relative to the support-carried abutment when the support-carried abutment is clamped, and means interlocking said two clamp means so as to effect clamping of the respective associated parts in alternation.

8. The combination of claim 7 including stop means positioned in the path of carrier movement for limiting the total distance said carrier may be shifted.

9. In a hobbing machine embodying an axially shiftable hob carrier, a support therefor, means to shift the carrier relative to the support, and clamp means for clamping the carrier to the support in shifted position, the combination of means for limiting the extent of shift of the hob carrier to a predetermined unit distance comprising an abutment member carried by said carrier, a normally fixed but shiftable rod member carried by said support, adjustable abutment collars mounted on said rod with portions thereof positioned in the path of movement of the abutment member carried by said support and with one abutment collar disposed at each side of the said abutment member, means normally effective to urge said rod member axially whereby to position one of the collars thereon in abutting relation with said abutment member and the other of said collars a predetermined distance away from said abutment member, means for clamping said rod and collars to the support, and means for actuating said two clamp means in alternation so that the carrier is shiftable when the said rod is clamped and the rod is shiftable when the carrier is clamped to thereby effect one or a succession of incrementally uniform carrier shift movements.

10. The combination of claim 9 in which said means normally effective to urge said rod member axially includes a pair of oppositely acting spring elements, and means selectively operable to render but one of the spring elements effective to urge said rod axially.

11. In a hobbing machine, the combination of reciprocable hob slide, bearing means in the slide for rotatively supporting a hob, manually operable means to shift said bearing means and hob relative to the slide in a direction axially of the hob, bearing-clamp means adapted when actuated to clamp said bearing in a selected shifted position to said slide, means for effecting a succession of incrementally uniform units of shift to the bearing means including a normally fixed but relatively shiftable member mounted on said slide, spaced apart abutment means carried thereby, abutment means carried by said bearing means in coacting position between the abutments on said shiftable member, means operative when said bearing means is clamped to shift said shiftable member a preselected unit distance relative to the said abutment means of the said bearing, means operative to clamp said shiftable member in a shifted position, and means operative to actuate said last-named clamp means and said bearing clamp means in alternation whereby said slide-mounted abutment means is clamped when said bearing means is unclamped and free to be shifted, and said slide-mounted abutment means is unclamped and free to be shifted when said bearing means is clamped to the slide, means for reciprocating the slide, means for tallying slide reciprocations, and means responsive to a predetermined member of slide reciprocations to remind the operator to shift the hob axially a unit distance.

12. The combination of claim 11 including means for limiting the total distance the hob may be shifted from its initial position.

13. A hobbing machine embodying an axially shiftable hob a relatively stationary hob carrier and means to shift the hob combining means for effecting a succession of incrementally uniform units of shift of the hob relative to the carrier in a selected direction comprising an abutment member shiftable with the hob, a normally stationary but relatively shiftable pair of abutment elements disposed in the path of movement of said first abutment member and positioned at opposite sides thereof, means for clamping the hob to the carrier in axially shifted position, means for clamping said pair of abutment elements to the carrier in a position wherein one of the said elements is against and the other is spaced from the said abutment member, and means operatively connected with said two clamp means for actuating the respective clamp means simultaneously in relatively opposite directions so that said carrier abutment member is unclamped and may be shifted the remaining distance between said pair of abutment elements when the latter are clamped to the carrier and said abutment elements are unclamped and may be shifted the said distance when the hob carrier is clamped.

14. The combination of claim 13 including means for limiting the total shift of the hob in either direction.

15. In combination with a hobbing machine embodying a laterally shiftable hob, means for shifting the hob a unit distance from an initial centralized position relative to the axis of a work blank comprising two realtively and independently shiftable elements, one of said elements comprising an abutment element mounted for movement bodily laterally with the shiftable hob, and the other of said elements comprising opposed abutment elements arranged one on each side of the first-mentioned abutment element with a predetermined intervening space, clamp means for each of said relatively shiftable elements including means for actuating the clamps selectively but oppositely, means operative when the hob is unclamped to shift the hob and its associated abutment element from an initial position wherein its abutment element is in engagement with one of said opposed abutment elements and the said intervening space is disposed ahead in the direction of shift to a position wherein its abutment element engages the other of said opposed abutment elements and the intervening space is disposed to the rear of the shifted abutment, and means operative on a reclamping of the hob and its associated abutment element and an unclamping of the opposed abutments to shift the opposed abutment elements in an overtaking direction whereby to position the said intervening space again ahead of the part to be shifted, and means for varying the size of the said intervening space between the abutments.

References Cited in the file of this patent

UNITED STATES PATENTS

| Number | Name | Date |
| --- | --- | --- |
| 2,073,917 | Zimmermann | Mar. 16, 1937 |
| 2,101,183 | Lawton | Dec. 7, 1937 |
| 2,291,508 | Staples et al. | July 28, 1942 |
| 2,389,815 | Ransome | Nov. 27, 1945 |
| 2,437,829 | Mason | Mar. 16, 1948 |
| 2,451,447 | Ransome | Oct. 12, 1948 |
| 2,483,810 | Cotta | Oct. 4, 1949 |
| 2,484,856 | Purvin | Oct. 18, 1949 |